United States Patent Office 3,259,627
Patented July 5, 1966

3,259,627
FURYL AND THIENYL HYDROXYARYL-
1,3,5-TRIAZINES
Max Duennenberger, Frenkendorf, and Christian Luethi,
Munchenstein, Switzerland, assignors to Ciba Limited,
Basel, Switzerland, a Swiss company
No Drawing. Filed Feb. 12, 1964, Ser. No. 344,241
Claims priority, application Switzerland, Feb. 18, 1963,
1,991/63
16 Claims. (Cl. 260—248)

The present invention provides new, valuable hydroxy-aryl-1:3:5-triazines of the general formula 1)
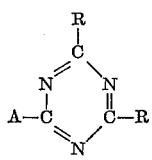

where R represents a hydroxybenzene radical which contains a hydroxyl group in vicinal position to the bond to the triazine ring, and A represents a thiophene or furan radical bound through one of its cyclic carbon atoms to the triazine ring.

R may represent, for example, a hydroxybenzene radical of the formula (2)
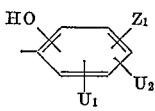

in which $U_1$ and $U_2$ are identical or different and each represents a hydrogen atom or an alkyl group with up to 4 carbon atoms, for example methyl, ethyl or tertiary butyl, and $Z_1$ represents a hydrogen atom an alkyl group with up to 4 carbon atoms, a hydroxyl group, for example a hydroxyalkoxy group such as

—O—CH$_2$—CH$_2$—OH
—O—CH$_2$—CH$_2$—CH$_2$—OH or

—O—CH$_2$—CHOH$_2$CH$_2$—OH or an alkenyloxy group such as —O—CH=CH$_2$ or

—O—CH$_2$—CH=CH$_2$ a phenoxy group, a phenylalkoxy group such as benzyloxy, or a 2:3-epoxypropoxy group, a carboxyalkoxy group which may be esterified with an alcohol, such as —O—CH$_2$—COOH and —O—CH$_2$—COOC$_2$H$_5$, or especially an alkoxy group with 1 to 18 carbon atoms such as —O—CH$_3$, —O—C(CH$_3$)$_3$, —O—(CH$_2$)$_7$—CH$_3$ or —O—(CH$_2$)$_{17}$—CH$_3$.

The radical R in the Formula 1 represents preferably a hydroxybenzene radical of the formula (3)
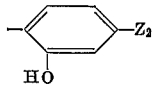

where $Z_2$ stands for a hydroxyl group, a hydroxyalkoxy or alkenyloxy group with up to 4 carbon atoms, a phenylalkoxy group or especially an alkoxy group with up to 12 carbon atoms.

The thiophene or furan radical A in the Formula 1 may correspond, for example, to the formula (4)
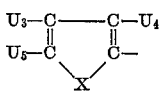

where $U_3$, $U_4$ and $U_5$ are identical or different and each represents a hydrogen atom, an alkyl group with up to 8 carbon atoms or a phenyl group, and X represents —O— or —S—.

Preferred use is made of thiophene or furan radicals of the formula (5)
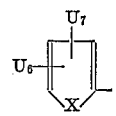

where $U_6$ and $U_7$ are identical or different and each represents a hydrogen atom, an alkyl group with up to 4 carbon atoms or a phenyl group, and X stands for —O— or —S—.

Accordingly, there may be specially mentioned from among the new hydroxyaryl-1:3:5-triazines of the general Formula 1, for example, those which correspond to the formula (6)
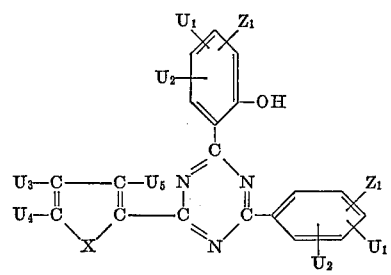

where $U_1$ to $U_5$, X and $Z_1$ have the same meanings as in the Formulas 2 and 4—and from among these hydroxyphenyl-1:3:5-triazines of the Formula 6 those deserve special mention which correspond to the formula (7)
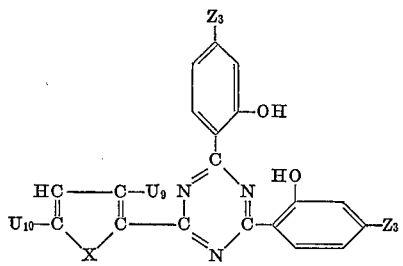

where $Z_3$ represents a hydrogen atom, an alkyl group with 1 to 4 carbon atoms, a hydroxyl group, a hydroxyalkoxy or alkenyloxy group with up to 4 carbon atoms, an alkoxy group with up to 8 carbon atoms or a phenylalkoxy group; X represents —O— or —S—, and $U_9$ and $U_{10}$ are identical or different and each represents a hydrogen atom, an alkyl group with up to 4 carbon atoms or a phenyl group.

The new hydroxyaryl-1:3:5-triazines of the above Formula 1 are obtained by known methods, for example when a dihalogeno-1:3:5-triazine of the formula (8)
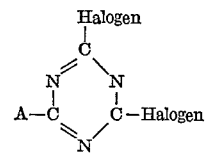

where A represents a furan or thiophene radical bound to the triazine ring through one of its cyclic carbon atoms—is reacted in an anhydrous medium in the presence of a Friedel-Crafts catalyst, particularly aluminum chloride, in an inert organic solvent with a compound of the benzene series, which contains in vicinal position to the resulting bond to the triazine ring a possibly etherified hydroxyl group, in a manner such that a hydroxyaryl-1:3:5-triazine of the Formula 1 is formed.

Hydroxyphenyl-1:3:5-triazines of the Formula 7 can be prepared, for example, by condensing 1 mol of a dichloro-1:3:5-triazine of the formula (9)

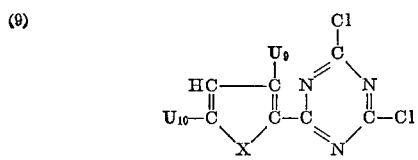

where $U_9$, $U_{10}$ and X have the above meanings—in an organic solvent such as benzene or nitrobenzene in the presence of aluminum chloride with 2 mols of a compound of the formula (3a)

where W represents a hydrogen atom or an alkyl group and $Z_3$ has the meaning defined in connection with the Formula 7.

As examples of compounds of the benzene series that contain in vicinal position to the resulting bond to the triazine ring a possibly etherified hydroxyl group, and yield the hydroxyaryl radical R in the Formula 1 or a hydroxybenzene radical of the Formula 3 or of the formula (3b)

(where $Z_3$ has the same meaning as in the Formula 7) there may be mentioned the following compounds:

1:3-dihydroxybenzene,
1-hydroxy-3-methoxybenzene,
1-hydroxy-3-ethoxybenzene,
1:3-dimethoxybenzene,
1:3-diethoxybenzene,
1:3-dihydroxy-4-methylbenzene,
1:3-dimethoxy-4-methylbenzene,
1-hydroxy-3-methylbenzene,
1-hydroxy-4-methylbenzene, and
1-hydroxy-3:4-dimethylbenezne.

When in the processes referred to above there are used as starting materials compounds of the benzene series that contain in vicinal position to the resulting bond to the triazine ring an etherified hydroxyl group, especially a lower alkoxy group such as methoxy, for the reaction with the halogeno-1:3:5-triazines, the reaction—especially when performed at an elevated temperature—is accompanied by the splitting of the etherified hydroxyl group in ortho-position to the resulting bond to the triazine ring so that these starting materials likewise yield hydroxyphenyl-1:3:5-triazines of the Formula 1.

Aryl-1:3:5-triazines of the Formula 1 that contain hydroxybenzene radicals which carry a hydroxyl group in ortho-position to the bond to the triazine ring and an etherified hydroxyl group in para-position thereto, can also be obtained by etherifying in an aryl-1:3:5-triazine containing hydroxybenzene radicals comprising a hydroxyl group both in ortho-position and in para-position to the bond to the triazine ring, subsequently the hydroxyl group in the para-position by a known method, for example with an alkylhalide such as an n-propylbromide, isopropylbromide or n-octylbromide, with a dialkylsulfate such as diethylsulfate, with a phenylalkylhalide such as benzylchloride, with an alkenylhalide such as allylbromide or with ethylenechlorohydrin, glycerin-α-chlorohydrin or epichlorohydrin (1-chloro-2:3-epoxypropane) or with chloracetic acid or an alkyl ester thereof.

The dihalogeno-1:3:5-triazines of the Formula 8 to be used as starting material in the processes described above are accessible by known methods, for example by condensing an appropriate heterocyclic carboxylic acid chloride with dicyandiamide, accompanied by elimination of hydrochloric acid, at a low temperature in the presence of an alkali, followed by selective hydrolysis of the imino and nitrile groups of the condensation product at an elevated temperature in the presence of a dilute mineral acid, cyclization to form the triazine ring accompanied by elimination of water in the presence of an alkali at an elevated temperature and subsequent replacement of the hydroxyl groups by halogen, more especially chlorine, for example with phosphorus pentachloride according to the following scheme of reactions (10)

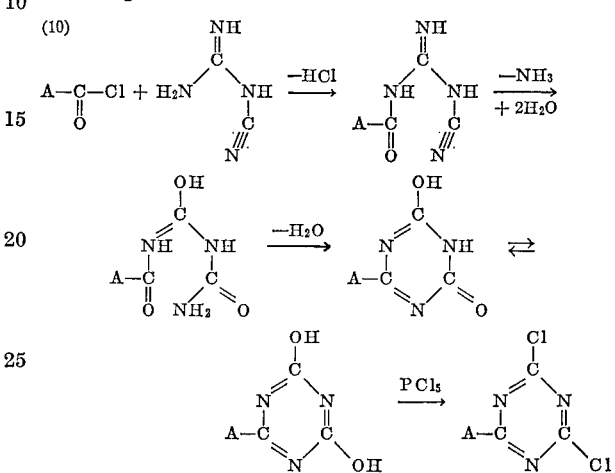

As examples of heterocyclic carboxylic acids, which may be used in the form of their acid chlorides for manufacturing the compounds of the Formula 8, there may be mentioned:

Thiophenecarboxylic acid-(2),
4-methyl-thiophenecarboxylic acid-(2),
5-methyl-thiophenecarboxylic acid-(2),
3:5-dimethyl-thiophenecarboxylic acid-(2),
5-tertiary octyl-thiophenecarboxylic acid-(2),
5-phenyl-thiophenecarboxylic acid-(2),
3:4-diphenyl-thiophenecarboxylic acid-(2),
3:4:5-trimethyl-thiophenecarboxylic acid-(2), and the corresponding furan-monocarboxylic acids which may be substituted in the heterocycle.

The new hydroxyaryl-1:3:5-triazines of the above-defined composition may be used as stabilizers for a wide variety of organic materials, more especially as ultraviolet filters.

Accordingly, the present invention includes also a process for protecting organic materials from the harmful effects of heat, air and especially ultraviolet rays, with the use of the new hydroxyaryl-1:3:5-triazines of the Formula 1.

Quite generally, there are three different ways of using the new products, either separately or in combinations:

(A) The stabilizer, especially the light filter, is incorporated with a substrate to protect it from the attack by ultraviolet rays, so as to prevent a change in one or more physical properties, for example discoloration, impairment of the tear strength, embrittlement or the like and/or chemical reactions triggered off, by ultraviolet rays, for example oxidation. The incorporation may take place before or during the manufacture of the substrate or subsequently by a suitable operation, for example by a fixing operation similar to a dyeing process.

(B) The light filter is incorporated with a substrate in order to protect one or more other substances contained in the substrate, for example dyestuffs, assistants or the like. The protection of the substrate described under (A) above may be achieved at the same time.

(C) The light filter is incorporated with a "filter layer" for the purpose of protecting a substrate placed directly underneath or at a distance from it (for example in a shop window) from the attack by ultraviolet rays. The filter layer may be solid (a film, foil or dressing) or semi-solid (a cream, oil or wax).

Thus, the process for protecting organic materials from the harmful effects of heat, air and especially ultraviolet rays consists in incorporating a new hydroxyaryl-1:3:5-triazine of the Formula 1 with, or fixing on, the organic material to be protected itself or a substrate containing the said material or a filter layer placed on top of the material to be protected.

As organic materials that can be protected there may be mentioned:

(a) Textile materials quite generally, which may be in any desired form e.g. in the form of fibers, filaments, yarns, woven or knitted fabrics or as felt, and all articles manufactured therefrom; such textile materials may consist of natural materials of animal origin, such as wool or silk, or of vegetable origin such as cellulose materials from cotton, hemp, flax, linen, jute and ramie; also of semi-synthetic materials such as regenerated cellulose, for example rayon, viscoses including spun rayon, or synthetic materials available by polymerization or copolymerization, for example polyacrylonitrile, polyvinyl chloride or polyolefines such as polyethylene and polypropylene, or those which are accessible by polycondensation, such as polyesters and above all polyamides. In the case of semi-synthetic materials it is of advantage to incorporate the protective agent already with a spinning mass, for example a viscose spinning mass, acetylcellulose spinning mass (including cellulose triacetate) and masses destined for the manufacture of fully synthetic fibers, such as polyamide melts or polyacrylonitrile spinning masses, before, during or after the polycondensation or polymerization respectively.

(b) Other fibrous materials which are not textile materials; they may be of animal origin such as feathers, hairs and pelts or hides and leathers made from the latter by natural or chemical tanning, as well as manufactured goods made therefrom; also materials of vegetable origin such as straw, wood, woodpulp or fibrous materials consisting of densified fibrous materials, more especially paper, cardboard or hardboard, as well as finished products made from the latter. Also paper pulps used in the manufacture of paper (for example hollander pulps).

(c) Coating and dressing agents for textiles and papers, for example those based on starch or casein or on synthetic resins, for example from vinylacetate or derivatives of acrylic acid.

(d) Lacquers and films of diverse composition, for example those from acetylcellulose, cellulose propionate, cellulose butyrate or cellulose mixtures, for example cellulose acetate+butyrate and cellulose acetate+propionate; also nitrocellulose, vinylacetate, polyvinyl chloride, polyvinylidene chloride, copolymers of vinyl chloride and vinylidene chloride, alkyd lacquers, polyethylene, polypropylene, polyamides, polyacrylonitrile, polyesters and the like. Another way of using the hydroxyaryl-1:3:5-triazines is their incorporation with wrapping materials, more especially the known transparent foils of regenerated cellulose (viscose) or acetylcellulose. In this case it is as a rule advantageous to add the protective agent to the mass from which these foils are manufactured.

(e) Natural or synthetic resins, for example epoxy resins, polyester resins, vinyl resins, polystyrene resins, alkyd resins, aldehyde resins such as formaldehyde condensation products with phenol, urea or melamine, as well as emulsions of synthetic resins (for example oil-in-water or water-in-oil emulsions). In this case it is of advantage to add the protective agent before or during the polymerization or polycondensation respectively. Furthermore, there may be mentioned synthetic resins reinforced with glass fibers and laminates made therefrom.

(f) Hydrophobic substances containing oil, fat or wax, such as candles, floor polishes, floor stains or other wood stains, furniture polishes, especially those destined for the treatment of light-colored, possibly bleached, wood surfaces.

(g) Natural rubber-like materials such as rubber, balata, gutta percha or synthetic, vulcanisable materials such as polybutadiene or copolymers of butadiene+styrene (for example Buna S) or butadiene+acrylonitrile (for example Buna N) which may also contain fillers, pigments, vulcanisation accelerators and the like, and in whose case the addition of the hydroxyaryl-1:3:5-triazines aims at delaying the ageing and thus prevent changes in the plasticity properties and embrittlement.

(h) Cosmetic preparations such as perfumes, dyed or undyed soaps and bath salts, skin and face creams, powders, repellants anad especially sunburn oils and creams.

It goes without saying that the hydroxyaryl-1:3:5-triazines are suitable as protective agents not only for undyed but also for dyed or pigmented materials; in this application the protection extends also to the dyestuffs, whereby in some cases very substantial improvements of the fastness to light are achieved. If desired, the treatment with the protective agent and the dyeing or pigmenting process may be combined.

Depending on the kind of material to be treated, demands made on the efficiency and durability and other requirements, the amount of the stabilizer, especially light filter, to be incorporated with the material to be treated may be varied within rather wide limits, for example from about 0.01 to 10%, preferably from 0.1 to 2%, of the weight of the material which is to be directly protected from the harmful effects of heat, air and especially ultraviolet rays.

Unless otherwise indicated, parts and percentages in the following examples are by weight. Melting points are uncorrected.

*Example 1*

14 parts of aluminum chloride are stirred at 5 to 10° C. into a solution of 11.6 parts of 2:4-dichloro-6-thienyl-(2′)-1:3:5-triazine of the Formula 15 and 11 parts of resorcinol in 200 parts of nitrobenzene. The temperature is raised to 55° C. within 30 minutes and the whole is stirred on for 16 hours at 55 to 60° C. and then poured into 1000 parts of 5% hydrochloric acid. The aqueous layer is separated and the residue subjected to steam distillation, to yield about 17 parts of the compound of the formula (11)

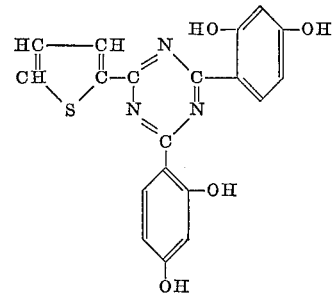

in the form of yellow crystals. The analytically pure product obtained after three recrystallizations melts at 342 to 344° C.

$C_{19}H_{13}O_4N_3S$—Calculated: C, 60.15%; H, 3.45%; N, 11.08%. Found: C, 59,95%; H, 3.45%; N, 10.70%.

The 2:4 - dichloro - 6 - thienyl-(2′)-1:3:5-triazine used in this example as starting material can be prepared in the following manner:

117 parts of thiophene-2-carboxylic acid chloride are stirred dropwise within one hour at −10° C. to 0° C. into a suspension of 85 parts of dicyandiamide in 800 parts of acetone and 105 parts of potassium hydroxide. The whole is stirred on for 3 hours at 20° C., poured into 4000 parts of water and 50 parts of glacial acetic acid are added, whereupon the product of the formula

(12) 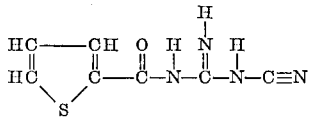

settles out in the form of colorless crystals. It is suctioned off and washed with 2000 parts of water.

The moist filter cake is suspended in 2000 parts of water, mixed with 80 parts of concentrated hydrochloric acid and then refluxed for 3 hours, cooled to 20° C., and the product of the formula

(13) 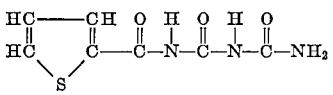

is suctioned off and washed with 1000 parts of water.

The moist filter cake is then stirred with 1300 parts of water containing 64 parts of potassium hydroxide for 16 hours at 60° C. to 65° C., then mixed with 80 parts of glacial acetic acid, cooled to 20° C. and suction-filtered. The product is washed first with 500 parts of 5% acetic acid and then with 2000 parts of water. After drying there are obtained 130 to 140 parts of the compound of the formula

(14) 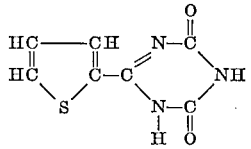

which, after one recrystallization from dimethylformamide, melts at 332 to 334° C.

20 parts of the above compound are refluxed for 3 hours with 45 parts of phosphorus pentachloride and 90 parts of phosphorus oxychloride. While being vigorously stirred, the mixture is then poured over 1600 parts of ice, whereupon the product of the formula

(15) 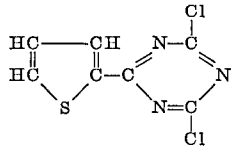

settles out in the form of light-yellow crystals; it can be purified by recrystallization from aqueous dioxane. M.P. 154 to 155° C.

When in the first paragraph of this example 2:4-dichloro - 6 - thienyl - (2') - 1:3:5 - triazine of the Formula 15 is replaced by an equivalent amount of 2:4-dichloro-6-phenylthienyl-(2')-1:3:5-triazine of the formula

(16) 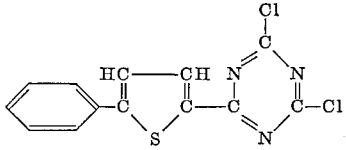

melting at 155 to 156° C., the compound of the formula,

(17) 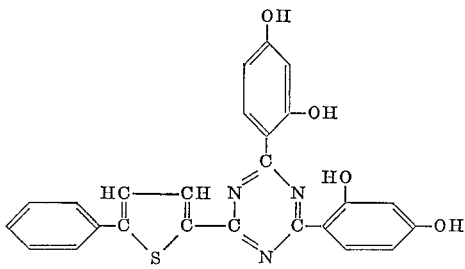

is obtained, which melts at 330° C. on recrystallization from aqueous dioxane.

$C_{25}H_{17}O_4N_3S$—Calculated: C, 65.92%; H, 3.76%; N, 9.23%. Found: C, 65.14%; H, 3.96%; N, 9.04%.

When in the first paragraph of this example 2:4-dichloro - 6 - thienyl - (2') - 1:3:5 - triazine of the Formula 15 is replaced by an equivalent amount of 2:4-dichloro-6 - [3':5' - dimethylthienyl - (2')] - 1:3:5 - triazine of the formula

(18) 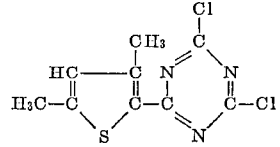

melting at 143 to 144° C., the product of the formula

(19) 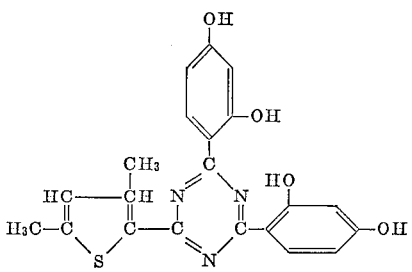

is obtained in a similar purity and yield; it melts at 313 to 315° C. An analytically pure product, obtained after four recrystallizations from aqueous dioxane, reveals the following data:

$C_{21}H_{17}O_4N_3S \cdot HO$—Calculated: C, 59.28%; H, 4.50%; N, 9.82%. Found: C, 59.81%; H, 4.50%; 9.75%.

When in the first paragraph of this example 2:4-dichloro - 6 - thienyl - (2') - 1:3:5 - triazine of the Formula 15 is replaced by an equivalent amount of 2:4-dichloro-6-furyl-(2')-1:3:5-triazine of the formula

(20) 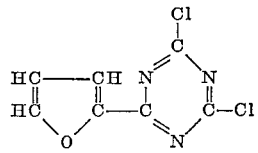

melting at 102 to 103° C., the product of the formula

(21) 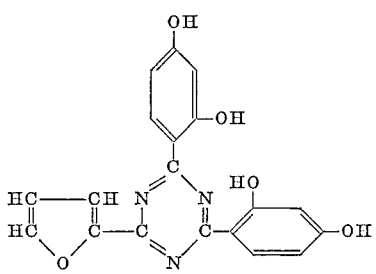

is obtained in a similar purity and yield. The analytically pure product obtained after five recrystallizations from aqueous ethanol melts at 332 to 334° C. and reveals the following data:

$C_{20}H_{13}O_5N_3 \cdot H_2O$—Calculated: C, 61.07%; H, 3.84%; N, 10.68%. Found: C, 60.94%; H, 3.96%; N, 10.90%.

*Example 2*

11.1 parts of the compound of the Formula 11 are dissolved at 75° C. in 120 parts of alcohol, 2.4 parts of sodium hydroxide in 10 parts of water and 30 parts of 2 N-sodium carbonate solution. Within ½ hour 9.5 parts of diethylsulfate are stirred into the solution which is then heated for one hour at 75 to 80° C., and then cooled to 0° C., whereupon the product of the formula

(22) 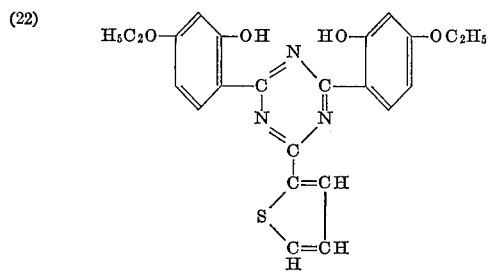

settles out in light-yellow crystals which are suctioned off, washed with 20 parts of alcohol and twice recrystallized from dimethylformamide+alcohol. Yield: about 8 parts. M.P. 223 to 224° C.

$C_{23}H_{21}O_4N_3S$—Calculated: C, 63.43%; H, 4.86%; N, 9.65%. Found: C, 63.07%; H, 4.95%; N, 9.95%.

*Example 3*

3.8 parts of the compound of the Formula 11 are dissolved at 70° C. in 50 parts of dimethylformamide containing 0.85 part of sodium hydroxide. In the course of one hour 4 parts of n-octylbromide are then stirred in dropwise, the whole is stirred for another 2 hours at the same temperature and then cooled to 0° C., whereupon the product of the formula

(23) 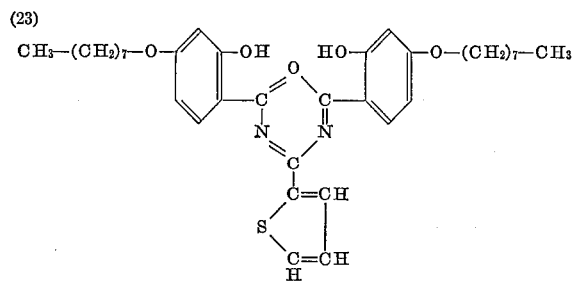

settles out in the form of light-yellow crystals. Yield: 4 to 5 parts.

The analytically pure product, obtained after two recrystallizations from dimethylformamide, melts at 124 to 125° C.

$C_{35}H_{45}O_4N_3S$—Calculated: C, 69.62%; H, 7.51%; N, 6.96%. Found: C, 69.74%; H, 7.69%; H, 6.91%.

When the 4 parts of n-octylbromide are replaced by an equivalent amount of allylbromide or benzylbromide, there are obtained in a similar purity and yield the compounds of the following formulae:

(24) 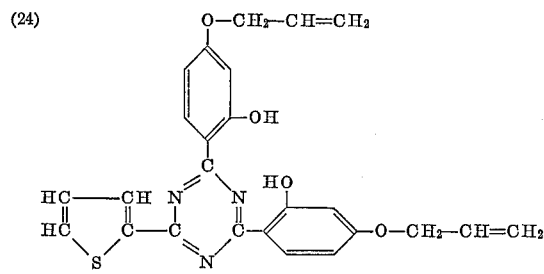

M.P. 170–171° C.

$C_{25}H_{21}O_4N_3S$—Calculated: C, 65.34%; H, 4.61%; N, 9.14%. Found: C, 65.48%; H, 4.66%; N, 9.12%, and

(25) 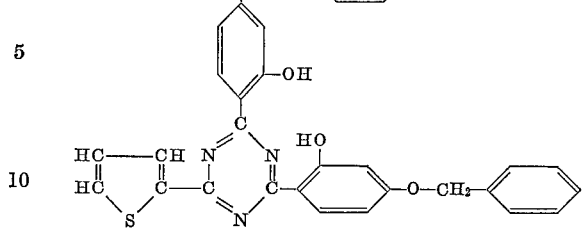

M.P. 140–141° C.

$C_{33}H_{25}O_4N_3O$—Calculated: C, 70.82%; H, 4.50%; N, 7.51%. Found: C, 71.65%; H, 4.55%; N, 7.52%.

*Example 4*

9 parts of the compound of the Formula 19 obtained as described in Example 1 are dissolved in 50 parts of ethyleneglycol monomethyl ether containing 1 part of sodium hydroxide. 9 parts of n-octylbromide are then dropped in at 25 to 30° C., and the solution is stirred on for 3 hours at 70 to 75° C., then cooled to 0° C., suctioned and dried, to yield the compound of the formula

(26) 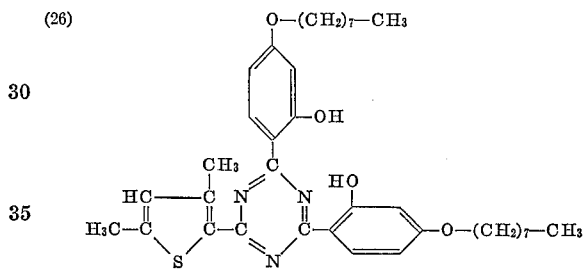

which, after three recrystallizations from benzene+methanol melts at 109.5 to 110.5° C.

$C_{37}H_{49}O_4N_3S$—Calculated: C, 70.33%; H, 7.82%; N, 6.65%. Found: C, 70.03%; H, 7.81%; N, 6.77%.

*Example 5*

3.6 parts of the compound of the Formula 21 are dissolved at 60° C. in 60 parts of acetone, 8 parts of 2.4 N-sodium carbonate solution, 1 part of sodium hydroxide and 5 parts of water. In the course of 20 minutes 3.3 parts of diethylsulfate are stirred dropwise and the whole is heated for 2 hours at 60 to 65° C., then cooled to 0° C., and the product of the formula

(27) 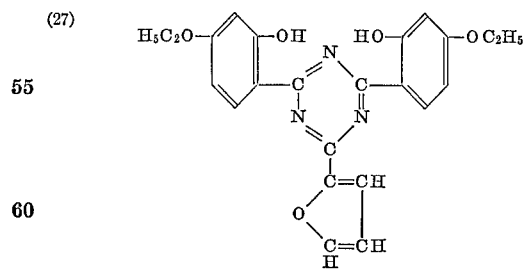

settles out in the form of light-yellow crystals which are suctioned off, washed with 20 parts of alcohol and recrystallized twice from dimethylformamide+alcohol. Yield: about 3 parts. M.P. 247.5 to 248.5° C.

$C_{23}H_{21}O_5N_3$—Calculated: C, 65.86%; H, 5.05%; N, 10.02%. Found: C, 65.67%; H, 5.25%; N, 10.15%.

*Example 6*

8 parts of the compound of the Formula 21 are dissolved in 70 parts of dimethylformamide containing 1.7 parts of sodium hydroxide. While stirring at 30° C., 7 parts of benzylbromide are added and the mixture is stirred for 2 hours at 60° C., and poured into dilute hydrochloric acid, whereupon the product of the formula (28)

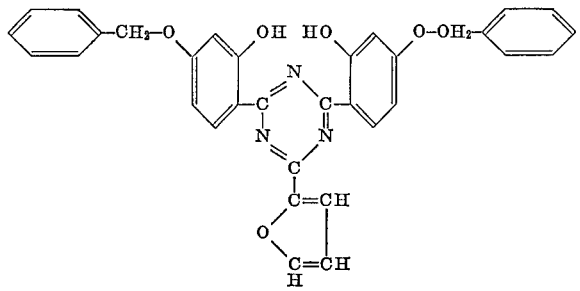

settles out in the form of faint-yellow crystals. Yield: about 10 parts.

The analytically pure product obtained after three recrystallizations from benzene+ethanol, melts at 180 to 181° C.

$C_{33}H_{25}O_5N_3$—Calculated: C, 72.92%; H, 4.64%; N, 7.73%. Found: C, 73.00%; H, 4.87%; N, 7.33%.

When the 7 parts of benzylbromide are replaced by 5 parts of allylbromide, the product of the formula (29)

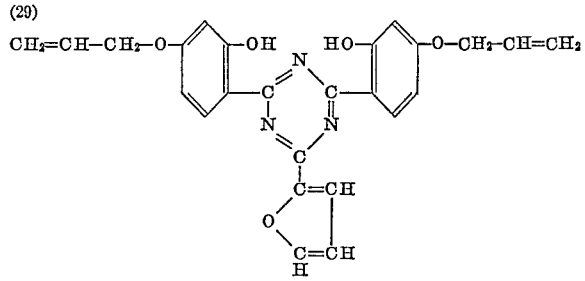

is obtained in a similar purity and yield. It melts at 184 to 185° C.

$C_{25}H_{21}O_5N_3$—Calculated: C, 67.71%; H, 4.77%; N, 9.48%. Found: C, 67.85%; H, 4.86%; N, 9.19%.

*Example 7*

10.6 parts of the compound of the Formula 11 together with 2.5 parts of sodium hydroxide are dissolved in 60 parts of dimethylformamide, and within one hour 5 parts of ethylenechlorohydrin in 20 parts of dimethylformamide are stirred in dropwise at room temperature (18° C.). The temperature is then raised every hour by 10° C. to 60–65° C. at which final temperature the whole is stirred on for 6 hours. The temperature is then rapidly raised to 120° C. and water is added to produce a slight turbidity. After cooling, the batch is suction-filtered and the residue rinsed with water containing a small amount of hydrochloric acid.

Yield: 8.3 parts of the product of the formula (30)

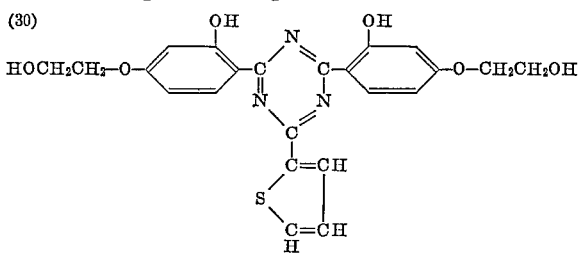

which, after two recrystallizations from alcohol, melts at 222 to 223° C.

$C_{23}H_{21}N_3O_6S$—Calculated: C, 59.09%; H, 4.53%; N, 8.99%. Found: C, 58.82%; H, 4.49%; N, 9.09%.

*Example 8*

A mixture of 11.9 parts of para-cresol and 250 parts of dichlorobenzene is heated to the boil; to remove any moisture about 30 parts of this mixture are then distilled off. After cooling, 11.6 parts of thienyldichlorotriazine of the Formula 15 and then 17.5 parts of aluminum chloride are added; the temperature is raised for 5 hours to 50° C., then for 2 hours to 80° C., and the batch is finally refluxed for 18 hours.

After cooling, the complex is decomposed by being poured into a mixture of 200 parts of ice, 500 parts of water and 30 parts of concentrated hydrochloric acid, decantation to approximate freedom from acid is performed and the solvent is removed by steam distillation.

The precipitated crude product (about 9.5 parts) is boiled in 150 parts of methanol, and the insoluble share is recrystallized first from aqueous dimethylformamide and then from ethyl acetate+methanol. It corresponds to the formula (31)

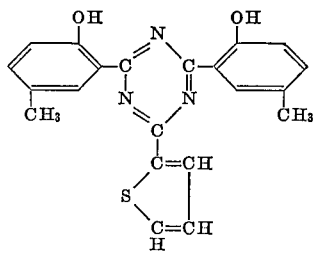

M.P. 222–223° C.

$C_{21}H_{17}O_2N_3S$—Calculated: C, 67.18%; H, 4.56%; N, 11.19%. Found: C, 67.06%; H, 4.74%; N, 11.00%.

*Example 9*

A film about 60μ thick is prepared from a 10% acetonic solution of acetylcellulose, containing 1% of the compound of the Formula 11 referred to the weight of acetylcellulose. After drying the film, it reveals the following values of light transmission in percent:

| Wavelength in mμ | Light transmission in percent ||
|---|---|---|
|  | Unexposed film | Film exposed for 100 hours in a fadeometer |
| 280 to 370 | 0 | 0 |
| 380 | 5 | 5 |
| 390 | 35 | 35 |
| 400 | 75 | 75 |

Similar results are obtained with the compounds of the Formulae 17, 19, 21, 22, 24, 25, 27 or 28.

*Example 10*

10,000 parts of a polyamide in chip form, prepared in known manner from hexamethylenediamine adipate, are mixed for 12 hours in a tumbler with 30 parts of titanium dioxide (rutile modification) and with 50 parts of the compound of Formula 11, 17, 19, 21, 22, 25, 27, 28 or 30. The chips treated in this manner are then melted in a boiler heated with oil at 300 to 310° C., after having displaced the atmospheric oxygen from it by means of superheated steam, and the melt is stirred for half an hour, then expressed under a nitrogen pressure of 5 atmospheres (gauge) through a spinneret, and the cooled filament spun in this manner is wound on a spinning bobbin. The tear strength of the resulting filaments after stretching is much less reduced by the action of light than that of filaments manufactured without addition of the compound of the Formula 11, 17, 19, 21, 22, 25, 27, 28 or 30.

*Example 11*

A paste from 65 parts of polyvinyl chloride, 32 parts of dioctyl phthalate and 0.2 part of the compound of the Formula 22 is rolled to and fro on a calender heated at 145 to 150° C. to form a foil about 0.5 mm. thick. The polyvinyl chloride foil manufactured in this manner absorbs all ultraviolet rays within the range of 280 to 360 m$\mu$.

Instead of the compound of the Formula 22 there may be used any one of the compounds of the Formulae 23 to 29.

*Example 12*

1.0 part of the compound of the Formula 11 is dissolved in 100 parts by volume of 3% sodium hydroxide solution and 100 parts by volume of ethanol. 3000 parts of water and 3 parts of an aqueous solution of the adduct from 35 mols of ethylene oxide with 1 mol of stearyl alcohol are then added. The resulting solution is neutralized with 10% sulfuric acid while checking with a potentiometer until the pH value has reached 7, whereupon a fine dispersion forms. 100 parts of a fabric from polyamide fibers (prepared from hexamethylenediamine and adipic acid are immersed in the bath at room temperature, the whole is slowly raised to the boil and the fabric is then treated for another hour at the boil, then removed from the bath, rinsed in cold water and dried.

The fabric treated in this manner displays after 100 hours' exposure to a xenone lamp a much lesser drop in tear strength than when the compound of the Formula 11 has been omitted.

Similar good results are obtained when the compound of the Formula 11 is replaced by the compound of the Formula 27 or 30.

*Example 13*

A paper pulp is manufactured in a hollander from 150 parts of bleached sulfite or sulfate cellulose
60 parts of zinc sulfide
6 parts of aluminum sulfate,
3 parts of a finely dispersed aqueous paste containing 30% of the azo pigment of the formula

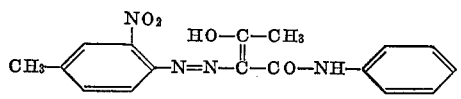

and 5000 parts of water.

The decorative paper prepared from this pulp is immersed with untreated tissue or overlay paper in a bath consisting of 100 parts of a pulverulent, curable, water-soluble condensation product from 1 mol of melamine and about 2 mols of formaldehyde, and
100 parts of a solution prepared from 0.5 part of the compound of the Formula 11, 25, 27, 28, or 29 in 19.5 parts of dimethylformamide by dilution with 80 parts of water.

The excess resin solution is then removed and the papers are dried.

The decorative paper prepared in this manner, together with the treated tissue paper used as cover sheet, is pressed on a substrate consisting of a layer of phenol paper and blocking sheets impregnated with melamine resin as interlayer for 10 minutes at 140 to 150° C. under a pressure of 100 kg. per square centimeter.

After having been exposed in a fadeometer the resulting laminate is much faster to light than a similar laminate that does not contain the compound of the Formula 11, 25, 27 or 29.

*Example 14*

A mixture of 100 parts of polyethylene and 0.2 part of a compound of the Formula 23, 26, 27, 28 or 29 is rolled on a calender at 130 to 140° C. to form a foil which is then pressed at 140° C.

The polyethylene foils obtained in this manner are substantially impermeable to ultraviolet rays of a wavelength of 280 to 380m$\mu$.

*Example 15*

A mixture of 100 parts of polypropylene and 0.2 part of a compound of the Formula 23 or 26 is made into a foil on a calender at 170° C., and then pressed into a sheet 1 mm. thick at 230 to 240° C. under a pressure not exceeding 40 kg. per square centimeter.

The resulting polypropylene sheet does not transmit ultraviolet rays within the range from 280 to 380m$\mu$.

What is claimed is:

1. A hydroxyphenyl-1:3:5-triazine of the formula

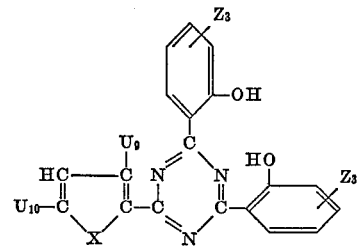

wherein $U_9$ and $U_{10}$ each is a member selected from the group consisting of hydrogen, lower alkyl and phenyl, X stands for a member selected from the group consisting of —S— and —O—, and $Z_3$ is selected from the group consisting of —OH, lower alkyl, lower alkenyloxy, hydroxy(lower)alkoxy, phenyl(lower)alkoxy and alkoxy with at most 8 carbon atoms.

2. The compound of the formula

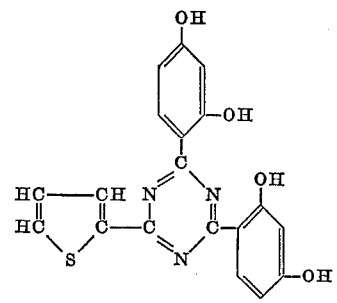

3. The compound of the formula

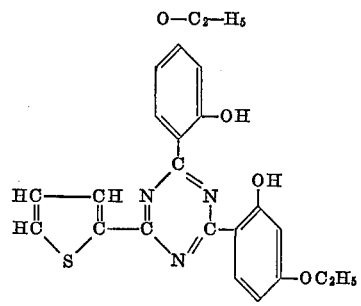

4. The compound of the formula

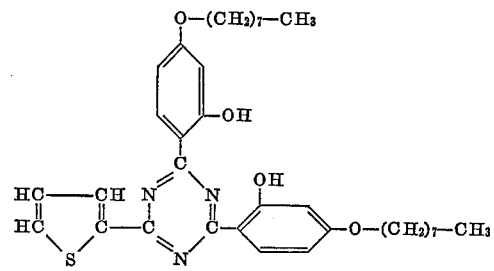

5. The compound of the formula

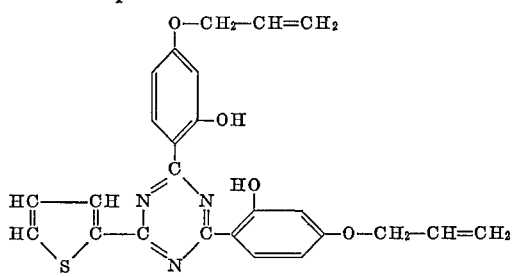

6. The compound of the formula

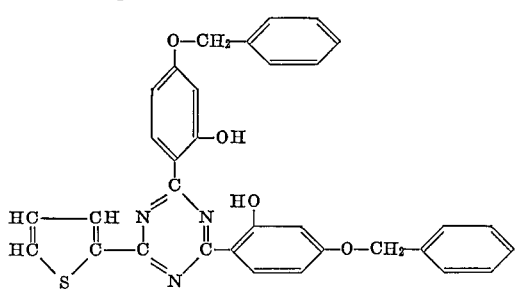

7. The compound of the formula

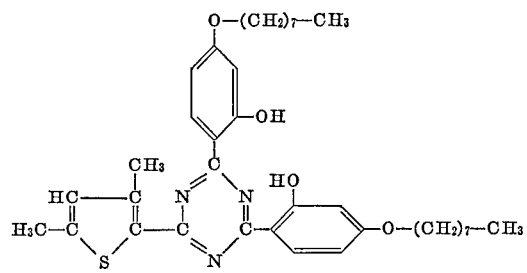

8. The compound of the formula

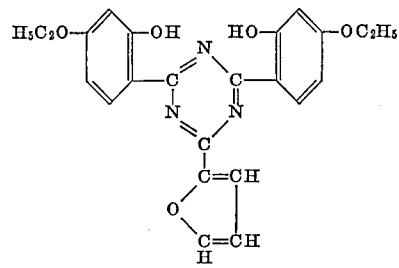

9. The compound of the formula

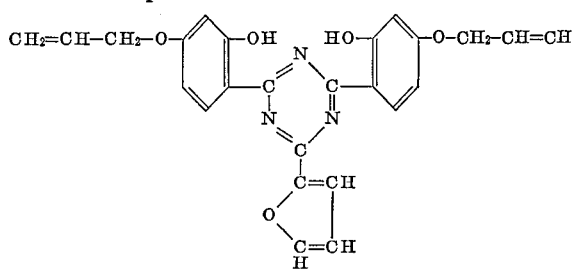

10. The compound of the formula

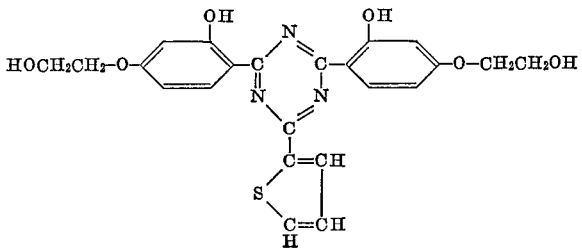

11. The compound of the formula

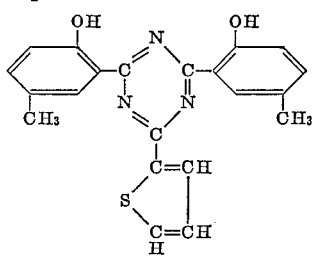

12. A hydroxphenyl-1:3:5-triazine of the formula

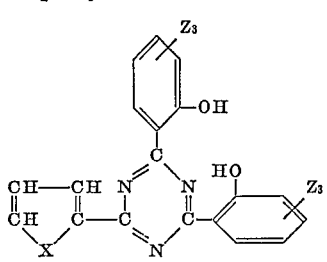

wherein X stands for a member selected from the group consisting of —S— and —O—, and $Z_3$ is selected from the group consisting of —OH, lower alkyl, lower alkenyloxy, hydroxy (lower) alkoxy, phenyl-(lower)alkoxy, and alkoxy with at most 8 carbon atoms.

13. A hydroxyphenyl-1:3:5-triazine of the formula

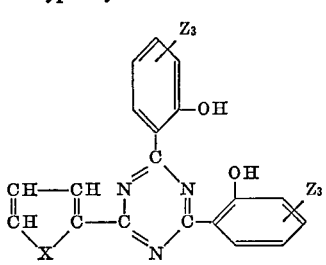

wherein X stands for a member selected from the group consisting of —S— and —O—, and $Z_3$ indicates a hydroxy(lower)alkoxy group.

14. A hydroxyphenyl-1:3:5-triazine of the formula

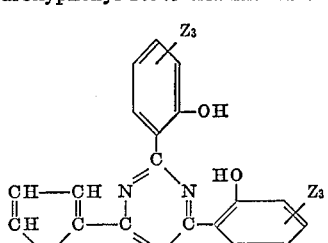

wherein X stands for a member selected from the group consisting of —S— and —O—, and $Z_3$ indicates a phenyl (lower)alkoxy group.

15. A hydroxyphenyl-1:3:5-triazine of the formula

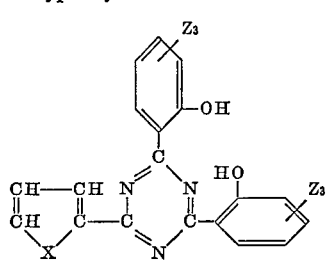

wherein X stands for a member selected from the group consisting of —S— and —O—, and $Z_3$ indicates an alkoxy group with at most 8 carbon atoms.

16. The compound of the formula

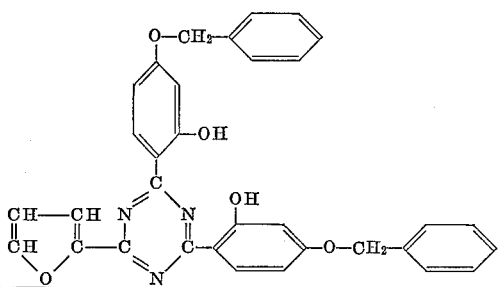

References Cited by the Examiner

UNITED STATES PATENTS

| | | | |
|---|---|---|---|
| 2,302,162 | 11/1942 | Zerweck et al. | 260—249.9 |
| 2,535,968 | 12/1950 | Thurston et al. | 260—249.9 |
| 3,113,943 | 12/1963 | Johns et al. | 260—248 |
| 3,118,887 | 1/1964 | Hardy et al. | 260—248 |

WALTER A. MODANCE, *Primary Examiner.*
NICHOLAS RIZZO, *Examiner.*
M. W. WESTERN, J. M. FORD, *Assistant Examiners.*

---

UNITED STATES PATENT OFFICE
CERTIFICATE OF CORRECTION

Patent No. 3,259,627  July 5, 1966

Max Duennenberger et al.

It is hereby certified that error appears in the above numbered patent requiring correction and that the said Letters Patent should read as corrected below.

Column 14, lines 50 to 59, the formula should appear as shown below instead of as in the patent:

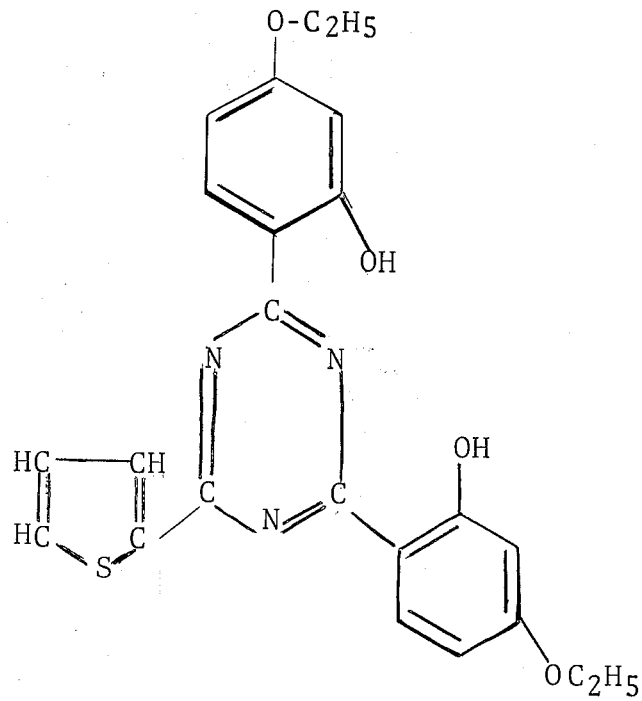

Signed and sealed this 1st day of August 1967.

(SEAL)
Attest:

EDWARD M. FLETCHER, JR.
Attesting Officer

EDWARD J. BRENNER
Commissioner of Patents

UNITED STATES PATENT OFFICE
CERTIFICATE OF CORRECTION

Patent No. 3,259,627                                                              July 5, 1966

Max Duennenberger et al.

It is hereby certified that error appears in the above numbered patent requiring correction and that the said Letters Patent should read as corrected below.

Column 14, lines 50 to 59, the formula should appear as shown below instead of as in the patent:

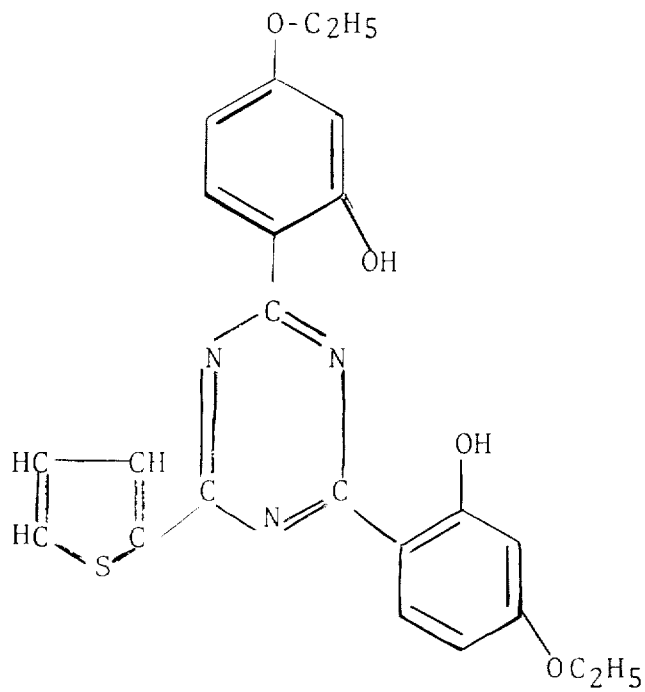

Signed and sealed this 1st day of August 1967.

(SEAL)
Attest:

EDWARD M. FLETCHER, JR.                         EDWARD J. BRENNER
Attesting Officer                                    Commissioner of Patents